3,529,857
LOCK JOINT CONNECTION FOR TUBING

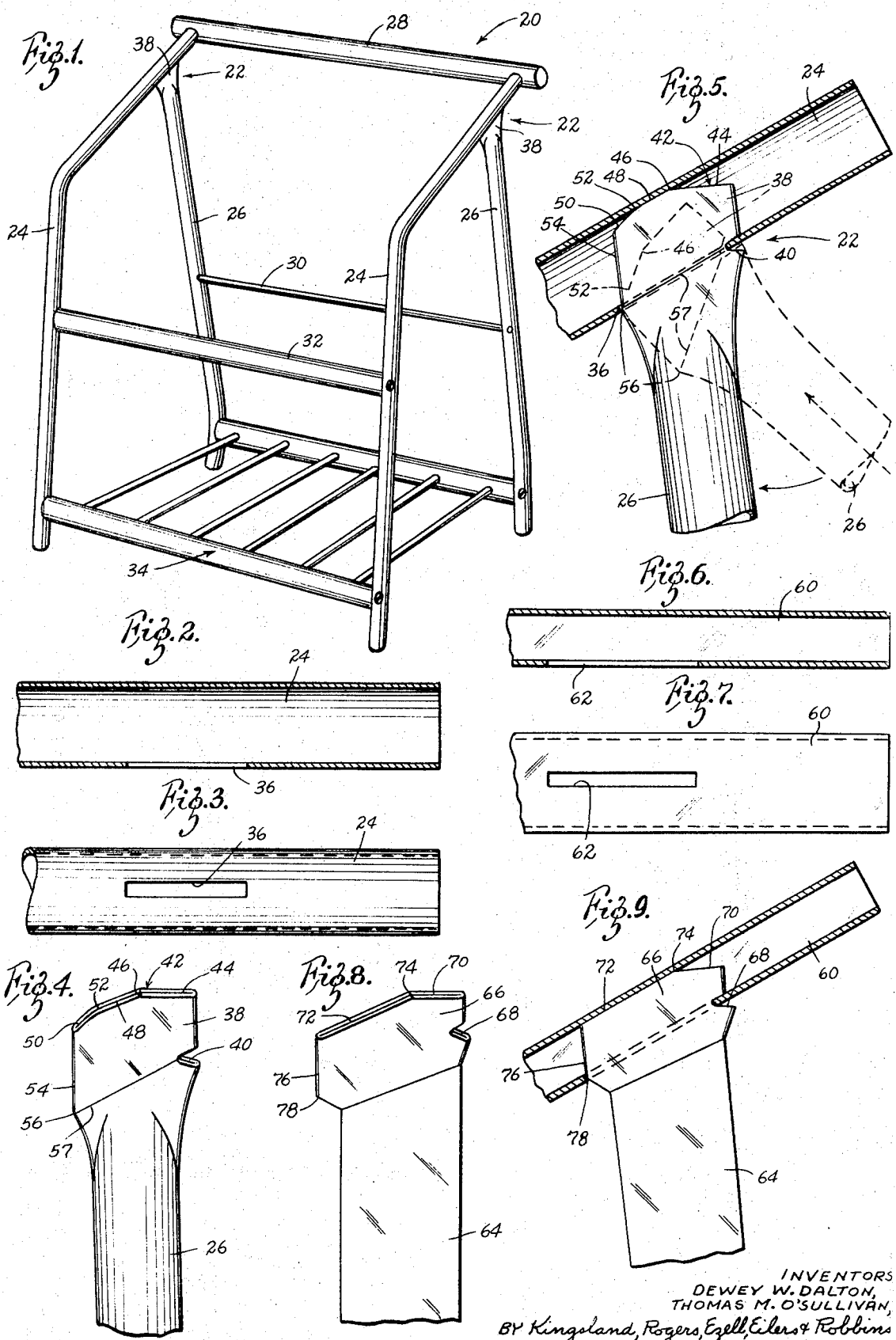

Dewey W. Dalton and Thomas M. O'Sullivan, Lamar, Mo., assignors, by mesne assignments, to O'Sullivan Industries, Inc., Wilmington, Del., a corporation of Delaware
Filed May 14, 1968, Ser. No. 728,941
Int. Cl. E04g 7/22
U.S. Cl. 287—20.5             1 Claim

ABSTRACT OF THE DISCLOSURE

A lock joint for connecting two pieces of tubing for general use and TV stands in particular. The lock joint comprises an elongated longitudinal slot in a first piece of tubing and a mating flattened end lock joint connection on a second piece of tubing. The second piece of tubing having the lock joint connection is comprised of a flattened end provided with a notch engaging the wall of the first tubing in fulcruming relation to engage a cam surface on the end of the flattened piece of tubing to press fit the second piece of tubing into locking engagement against the inner wall surface of the first tubing.

SUMMARY OF THE INVENTION

In the past joint connections for tubing for use in TV stands and other types of tubing connections have conventionally employed bolts or screws for connecting the tubing or brazing or welding. These connections are unsightly, time consuming and relatively expensive for construction. The easy breakdown and set up of tubing, particularly for TV stands and other types of tables, is important and such expense and time consuming factors as discussed above are obviated by this invention.

The lock joint provided by this invention is superior in appearance over the welded connection by avoiding the use of brazing flux or a weld bead, which evidence signs of heat causing unsightly discoloration in appearance. Further, knock-down packaging is made readily possible since the two pieces of tubing can be packed individually permitting smaller cartons. The lock joint additionally provides uniform strength in large production runs without the chance of faulty weld breaking or being bent in handling.

By means of this invention there has been provided a lock joint for tubing whereby one piece of tubing can be simply locked within the other at substantially a perpendicular or close to perpendicular relation by simply inserting an end of one tubing into an elongated slot of the other and moving it into firm locking relation. The set up or dismantling takes place in a matter of seconds without any tools required and the advantages are quite apparent.

The lock joint tubing provided through this invention can be used in cylindrical tubing or square tubing or any other type of cross section configuration. The joint is rugged, yet simple to fabricate and can be employed by unskilled workmen.

The above features are objects of this invention and further objects will appear in the detailed description which follows and will be otherwise apparent to those skilled in the art.

For the purpose of illustration of this invention, there is shown in the accompanying drawings embodiments of this invention utilizing cylindrical tubing and rectangular tubing. It will be understood that these drawings are for the purpose of example only and that the invention is not limited thereto, but that other types of tubing such as hexagonal cross section, oval tubing, and the like can be employed.

In the drawings:

FIG. 1 is a pictorial view of a TV stand provided with the lock joint tubing of this invention;

FIG. 2 is a view in axial cross section through cylindrical tubing showing a first piece of tubing with the lock slot;

FIG. 3 is a bottom plan view of the first piece of tubing showing the lock slot;

FIG. 4 is a fragmentary plan view of the top end of the second piece of tubing employing the flattened end with the fulcruming notch and end cam surface;

FIG. 5 is a view showing the first piece of tubing in axial cross section similar to FIG. 2, and the second piece of tubing similar to FIG. 4 in locking relation in full lines and in the beginning of the locking operation in dotted lines;

FIG. 6 is a view in longitudinal or axial cross section of a first piece of slotted rectangular tubing showing a modification;

FIG. 7 is a bottom plan view of the first piece of tubing shown in FIG. 6;

FIG. 8 is a plan view of the second piece of tubing for the embodiments of FIGS. 6 and 7 showing the notch and the camming surface; and FIG. 9 is a view showing the first piece of tubing similar to FIG. 6 in axial cross section and the second piece of tubing in locking engagement.

THE DESCRIPTION

A TV stand utilizing the lock joint of this invention is generally indicated by the reference numeral 20 in FIG. 1. The lock joint is generally indicated by the reference numeral 22 and is employed for connecting the tubular front leg 24 with a rear leg 26.

The TV stand is further comprised of a wood handle 28, a metal brace rod 30, a wooden rail 32, and a shelf section 34, all of which are joined in conventional fashion to the front and rear legs as shown utilizing screws and the like, which may be fastened into the tubing or inserts in the tubing where appropriate.

The front leg 24 is shown for the locking end portion in FIGS. 2 and 3. As there shown, it is provided with an elongated longitudinal slot 36 within which the flattened end portion of the rear leg 26 is adapted to be locked.

The rear leg 26 is best shown in FIG. 4. As there shown, it has a flattened end locking portion 38 provided with a notch 40 having a bearing edge formed at an obtuse angle to the axis of the leg 24 to which the rear leg is to be locked. A top camming portion 42 is formed by a surface 44, generally at right angles or perpendicular to the leg 26. The surface 44 then merges through a relatively sharp crown 46 with a camming surface 48, bounded by a sloping end portion 50, connected to the camming surface 48 by a relatively shallow crown 52. The flattened end portion has a perpendicular side wall 54 joined to the leg 26 by a crown 56.

In FIGS. 6 through 9, a modification is employed showing rectangular tubing rather than the cylindrical tubing of FIGS. 1 through 5. In FIG. 6 the front leg 60 is shown provided with a locking slot 62, similar to the locking slot 36 of the front leg 24. A rear leg 64 is provided with a flat end portion 66 having a locking notch 68 at one side. A first surface 70 merges with a locking or camming surface 72 through a relatively sharp crown 74. A perpendicular side surface 76 is connected to the leg through a crown portion 78.

USE

For assembly of the TV stand, the rear leg 26 is fitted into the locking slot 36 of the front leg 24. This fit is as shown in dotted lines in FIG. 5. In order to effect the locking relation the flattened portion 38 of leg 26 is inserted into slot 36 as in FIG. 5 with the forward end of the slot nestled into notch 40. Leg 26 is then rotated about this fulcrum point as in FIG. 5, until flattened portion 38 is fully received by slot. At this point the two leg components are firmly joined and locked by contact of a portion of edge 54 with the rear of slot 62 or contact of form line 57 between crown point 56 and notch 40 or both. At this point the two leg members are in final assembly position and need only to be retained by a cross member such as bottom shelf assemly 34. The rear leg 26 is then moved downwardly or counter-clockwise about the fulcruming relation of the locking notch 40 in the edge of the slot, as shown by the full-bodied arrow in FIG. 5.

The rest of the TV stand is then simply assembled. Thus, the bottom shelf assembly 34 is attached to the front and rear legs with conventional screws. This restrains the front and rear legs from moving with respect to each other, making it impossible for the lock joint to come apart. The wood handle 28, the metal rod 30, and the front rail 32, are then simply connected by screws to complete the assembly of the TV stand.

The modification showing the rectangular tubing in FIGS. 6 through 9 is assembled or locked in the same fashion as described for the cylindrical tubing of FIGS. 1 through 5.

Various changes and modifications may be made within the invention as will be readily apparent to those skilled in the art. Such changes and modifications are within the scope and teaching of this invention as defined by the claim appended hereto.

What is claimed is:
1. A lock joint for tubing comprising an elongated longitudinal slot in a first piece of tubing and a second piece of tubing having means for locking an end in said slot to lock said first and second pieces together at an obtuse angle, said end being provided with a notch adapted to engage the wall of said first tubing in a fulcrum relation to engage a cam surface into press-fit relation against an inner wall surface of said first tubing, said notch having a bearing edge forming an obtuse angle with the axis of said first piece of tubing, the locking end of the second piece of tubing being flattened to a thickness fitting within the elongated slot in the first piece of tubing and having a straight rear edge parallel to the axis of the second piece of tubing engageable in camming relation with the rear edge of said slot, the end of the second piece of tubing having a first surface extending from a forward side of the tubing to a crown engageable in bearing relation with the inside of the first piece of tubing, said crown being generally parallel to the bearing edge of said notch.

References Cited
UNITED STATES PATENTS

| | | | |
|---|---|---|---|
| 3,336,004 | 8/1967 | Edie et al. | 256—65 |
| 3,429,558 | 2/1969 | Burmann et al. | 256—65 |

DAVID J. WILLIAMOWSKY, Primary Examiner
W. L. SHEDD, Assistant Examiner

U.S. Cl. X.R.
211—182; 256—65